Figure 1:
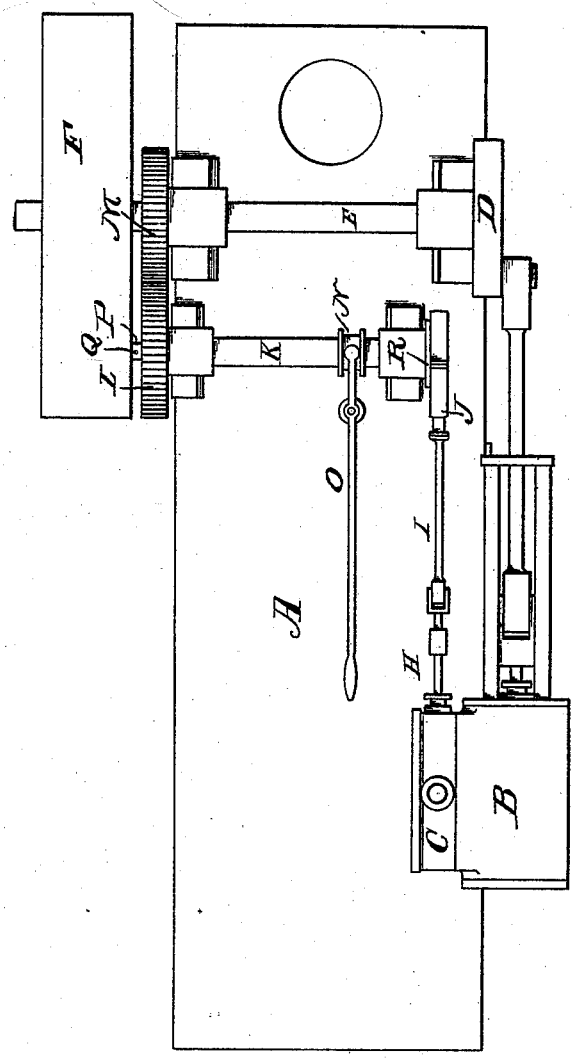

(No Model.)  2 Sheets—Sheet 1.
C. M. GIDDINGS.
VALVE GEAR FOR STEAM ENGINES.
No. 269,042. Patented Dec. 12, 1882.

WITNESSES:
John R. Woods
Geo. P. Tangeman

Charles M. Giddings INVENTOR
by James W. See
ATTORNEY

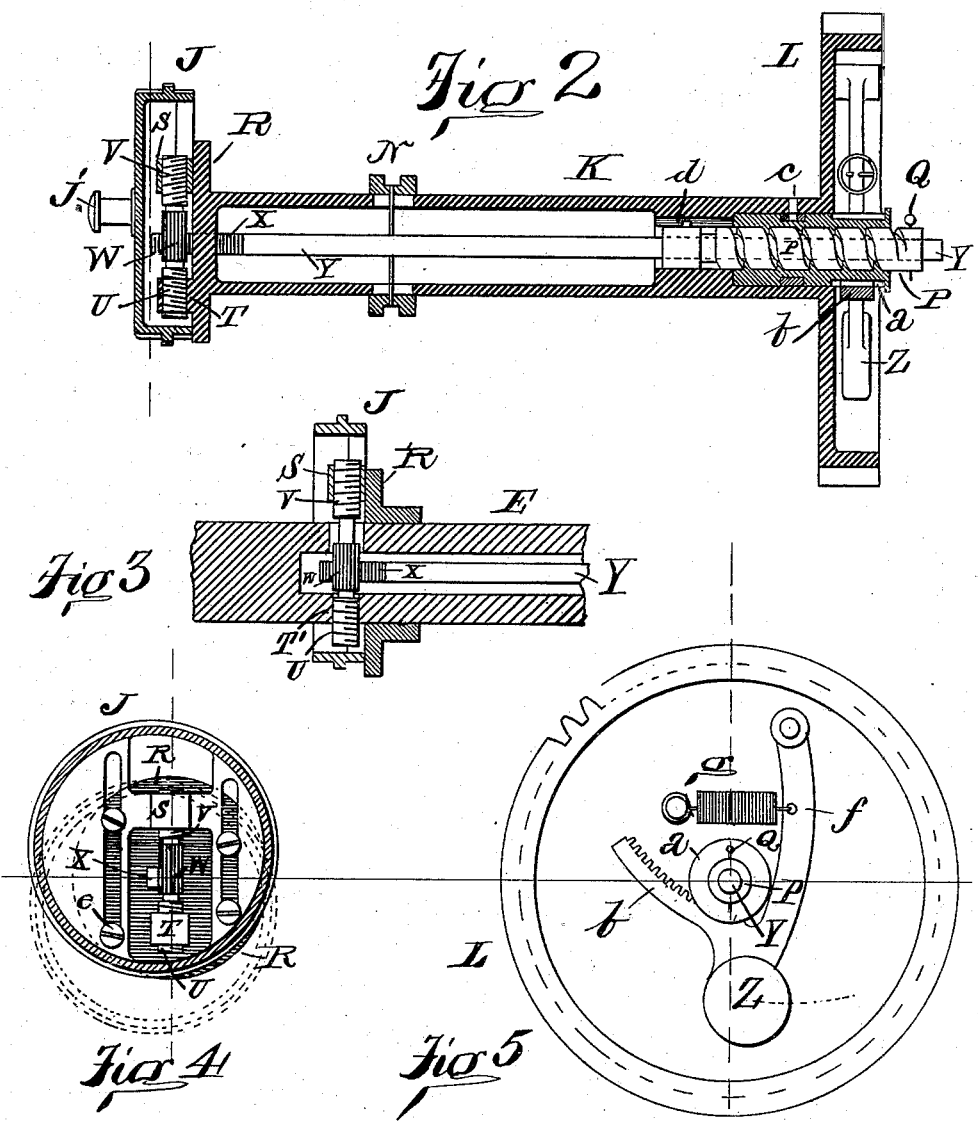

UNITED STATES PATENT OFFICE.

CHARLES M. GIDDINGS, OF MASSILLON, OHIO.

VALVE-GEAR FOR STEAM-ENGINES.

SPECIFICATION forming part of Letters Patent No. 269,042, dated December 12, 1882.

Application filed October 26, 1882. (No model.)

*To all whom it may concern:*

Be it known that I, CHARLES M. GIDDINGS, of Massillon, Stark county, Ohio, have invented certain new and useful Improvements in Valve-Gear for Steam-Engines, of which the following is a specification.

This invention relates to the valve-operating mechanism of steam-engines.

In the accompanying drawings, Figure 1 is a plan of an engine embodying my improvements; Fig. 2, a longitudinal section of the counter-shaft with its attachments; Fig. 3, a longitudinal section of the eccentric as applied to a main shaft; Figs. 4 and 5, end views of the counter-shaft and attachments.

In the description immediately following no attention need be paid to Fig. 3 of the drawings, which is a modification, as will be hereinafter referred to.

A is the boiler of a portable engine; B, the cylinder; C, the steam-chest; D, the crank; E, the shaft; F, the fly-wheel; H, the valve-stem, all constructed substantially as usual.

K is a hollow counter-shaft, mounted in boxes parallel with shaft E; L, a spur-gear on the end of this counter-shaft; M, a similar gear on main shaft E, meshing into gear L. R is a flange rigid with the counter-shaft; J, an eccentric on the counter-shaft; I, the eccentric-rod from the eccentric to the valve-stem; N, a collar fitted to slide on the counter-shaft, and O a hand-lever engaging collar N. The eccentric J is fitted to slide across flange R, so as to be capable of taking a position proper for a forward motion of the engine, or a backward motion of the engine, or for shorter throws when operating for either motion, as by the bolts and slots e.

S is a threaded nut rigid with the eccentric; T, a thread-nut rigid with counter-shaft; U, a left-hand screw, V a right-hand screw, and W a pinion, all in one piece; X, a rack fitted to move longitudinally in the counter-shaft and engage with pinion W; Y, a rod joined to rack X and extending through right end of counter shaft, the collar N being attached to rod Y to move with it; P, a screw attached to right end of rod Y; Q, a pin for attaching screw P to rod Y; d, a pin to prevent rotation of screw P in counter-shaft; a, a pinion having a threaded interior engaging-screw P; c, a pinned ring to prevent longitudinal motion of pinion-nut a; Z, a weight fitted to oscillate within gear L in the plane of pinion a; f, the pivot-arm for weight Z; b, a toothed sector rigid with weight Z and engaging with pinion a, and g a spring to resist centrifugal action of weight Z.

Rotation of the compound screw U V shifts the eccentric a distance due to the sum of the pitches of the screws. The work done by the eccentric does not, by reaction, cause the compound screw to rotate and undo its adjustment, as would be the case with a single screw whose pitch was equivalent to the compound screw. Reciprocation of rod Y rotates the screw and adjusts the eccentric, tending to shorten or lengthen the throw of the eccentric. Centrifugal action of weight Z rotates pinion-nut a and reciprocates rod Y, shortening stroke or throw of eccentric. Centrifugal action of weight Z increases throw of eccentric. Removing pin Q permits rod Y to be operated by lever O to adjust throw of eccentric or to put eccentric in position to reverse the motion of the engine.

This apparatus forms a combined regulating device and reversing device.

I do not confine myself to the centrifugal device set forth. Any form of centrifugal movement or mechanism which will serve to give reciprocation to rod Y will answer my purpose.

The eccentric may be guided by means different from that set forth, and, if desired, it may be arranged to swing in an arc instead of sliding in a line. Both the sliding and swinging motions are well known in connection with shifting eccentrics, and I contemplate applying my invention in connection with either, as desired.

The gear L need not essentially form the case for the centrifugal device, as the gearing may be placed on the shafts in other positions.

The counter-shaft is not essential. The devices may be used in connection with a hollow main shaft, as shown in Fig. 3, which needs no description; but the counter-shaft plan presents many advantages. It permits the main shaft to be set low down on the boiler of a portable engine, as the counter-shaft may stand at a different height. It avoids the weakness of a hollow main shaft. It admits of cast-iron construction. It permits a straight valve-connection, or an eccentric-rod without offset, while with all eccentrics on the main shaft a reasonable length in the main pillow-block compels an offset to be formed in the eccentric-rod or its connections in order to reach the valve-stem. It permits a straight valve-connection on engines having the steam-chest on top of the cylinder, as the counter-shaft may set over the main shaft, if desired. It permits the eccentric to be adjusted for angular position by changing the position relatively of one gear to the other. It permits the use of a crank instead of an eccentric, as at J', Fig. 2, in which the crank-wrist J' may be used to drive the valve, being a part of the eccentric J.

I claim as my invention—

1. The combination, substantially as set forth, of a shaft, a shifting eccentric, a screw to shift the eccentric, a reciprocating part to rotate the screw, and a hand-lever engaging said reciprocating part.

2. The combination, substantially as set forth, of a shaft, a shifting eccentric, a screw to shift the eccentric, a reciprocating part to rotate the screw, and a centrifugal regulator to actuate the reciprocating part.

3. The combination, substantially as set forth, of a shaft, a shifting eccentric, a screw to shift the eccentric, a reciprocating part to rotate the screw, a hand-lever to actuate the reciprocating part, a centrifugal regulator to actuate the reciprocating part, and a means for disconnecting said regulator from and connecting it to the reciprocating part.

4. A shaft and a shifting eccentric, combined with a compound screw to shift the eccentric on the shaft.

5. The combination, substantially as set forth, of a main shaft, a counter-shaft, spur-gearing, an eccentric on the counter-shaft, and a connection from the eccentric to the engine-valve.

6. The combination, substantially as set forth, of a reciprocating non-rotary screw, a rotary non-reciprocating nut, and a centrifugal device engaging said nut and adapted to rotate it.

CHARLES M. GIDDINGS.

Witnesses:
JOHN LORENZ,
GEORGE HANSON.